Dec. 17, 1963     I. P. MIGLIETTI ET AL     3,114,559
REINFORCED SEAL FOR ROTATABLE MEMBERS
Filed Feb. 18, 1959
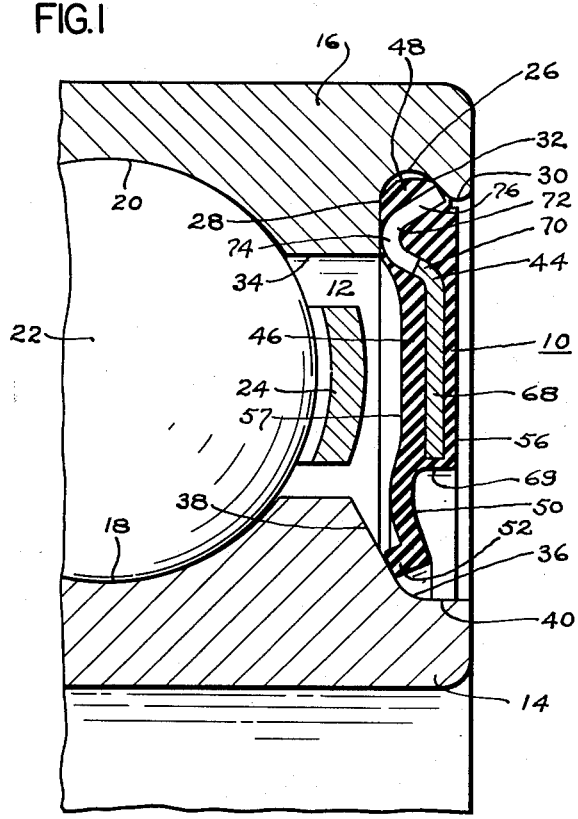
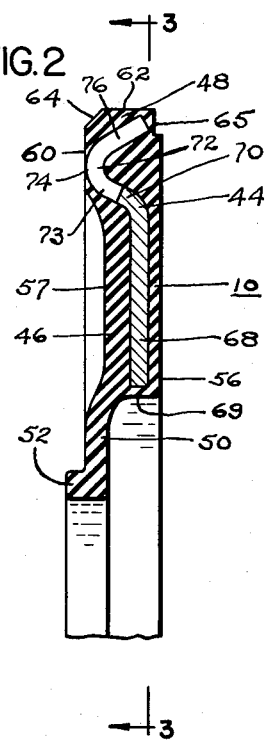
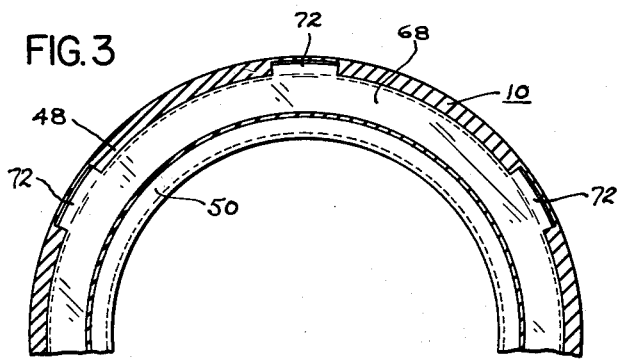
INVENTOR.
ITALO P. MIGLIETTI
WILFRED V. WARNER
BY Edward H. Goodrich.
THEIR ATTORNEY

United States Patent Office 3,114,559
Patented Dec. 17, 1963

3,114,559
REINFORCED SEAL FOR ROTATABLE MEMBERS
Italo P. Miglietti, West Hartford, and Wilfred V. Warner, Wolcott, Conn., assignors to General Motors Corporation, Detroit, Mich., a corporation of Delaware
Filed Feb. 18, 1959, Ser. No. 794,097
2 Claims. (Cl. 277—94)

This invention relates to a seal and its mounting between a pair of relatively rotatable members and more particularly to a seal for closing the end of an annular lubricant chamber between a pair of coaxial antifriction bearing members and which will maintain lubricant in the bearing and prevent the entrance of water and deleterious materials into the bearing.

To meet the requirements of industry for high speed accurate mechanisms and particularly for precision control instruments, there is an ever-increasing demand for ultra-precision ball bearings that will operate at very high speeds for long periods without attention. It is well recognized that the accurate operation and life of such bearings is largely dependent upon effective seals which are not frictionally detrimental to bearing operation and which will retain a small required volume of lubricant within such bearings while precluding entrance of dirt, dust and/or moisture into the bearing. In the past, seals and shields as commonly used to close the ends of an antifriction bearing have involved the use of a stack of several metal discs and yieldable intervening washers which had to be carefully assembled at time of installation and then permanently secured within the end of the bearing. This securing arrangement usually comprised the folding over and expansion of one of the metal shields into a grooved portion of one of the race rings with the objectionable result that frequently radial distorting forces were set up which spoiled the accurately ground contours of the bearing. Additionally, some forms of molded seals have been employed, but these have usually been cumbersome complicated arrangements which were difficult to install and which were held in position by metal rings that were also difficult to position.

An object of this invention is to provide an improved arrangement for installing a seal across the annular lubricant space between a pair of relatively rotatable members.

Another object of this invention is to provide an improved seal of simple construction which may be quickly and easily snapped into position across the end of an annular lubricant chamber to provide an effective sealing relation between a pair of relatively rotatable members.

It is a further object of this invention to provide an improved reinforced annular closure which may be easily and yieldably inserted in position and which will maintain an effective sealing relation without producing objectionable radial distorting stresses.

A still further object of this invention is to provide an improved closure for the end of a lubricant chamber in an antifriction bearing which will yieldably seat in position and maintain an effective sealing relation even in the event that the relatively rotatable bearing members rotate out of coaxial relation.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

FIGURE 1 is a cross sectional view of a portion of a ball bearing showing our improved seal installed in position;

FIGURE 2 is a fragmentary cross sectional view of the seal before installation; and FIGURE 3 is a fragmentary end view of our seal having parts cut away for better illustrative purposes.

Our improved seal which is generally indicated at 10, is illustrated in closing relation across the end of an annular lubricant chamber 12 between a pair of relatively rotatable inner and outer race rings 14 and 16 of an antifriction bearing such as a ball bearing. The inner and outer race rings 14 and 16 are respectively provided with annular raceways 18 and 20 which receive rolling elements as balls 22 guided by a separator 24 to provide for a relative coaxial antifrictional rotation of these race rings. It will also be appreciated that the seal 10 may be used in the same manner for closing the end of an annular lubricant chamber at one or both ends of the race rings of a roller bearing. One or both ends of one of the race rings, as 16, is provided with an annular seal mounting groove 26 herein shown in the outer race ring 16. This seal mounting groove is transversely curved between an annularly extending generally radially disposed shoulder 28 and a transversely rounded annularly extending land 30 at the outer end of the race ring. The side wall 32 of the groove 26 which merges with the transversely rounded land 30 is preferably frusto-conical and the groove 26 at its inward axial end blends into the annular shoulder 28. The annular land 30 has a diameter intermediate that of the bottom of the groove 26 and that of an inner cylindrical wall 34 extending from the shoulder 28 to the raceway 20. The other race ring as the inner race ring 14, is provided at its outer end with an annularly extending notch 36 in general radial alignment with the seal mounting groove 26. This notch is preferably provided with an inner frusto-conical wall 38 and a cylindrical bottom wall 40, these walls being connected by a short transversely curved portion.

The reinforced sealing member 10 comprises a molded resilient rubber-like washer containing an embedded reinforcing disc 44. This sealing member 10 may be formed from a suitable inherently resilient material such as a synthetic rubber or other compressibly resilient material which will not deteriorate or appreciably alter its resiliency in the presence of heat, light and/or bearing lubricants. One satisfactory rubber-like material for the sealing member 10 is composed of a resilient vulcanized synthetic rubber containing a polymerization product of butadiene acrylic nitrile. It will be appreciated, of course, that other molded materials such as suitable plastics or rubber-like materials having the desired characteristics may be used for the member 10. This molded sealing washer has a generally flat body portion 46 terminating at its outer radial end in a peripheral bead 48 and provided at its inner radial end with an annular resiliently flexible sealing lip 50 which is preferably axially inwardly offset from the body portion 46 and of an appreciably thinner wall thickness than the body portion. The inner radial portion of the sealing lip 50 may be provided with a laterally offset annular rib 52 arranged for lightly wiping sealing engagement with the frusto-conical wall 38. The body portion 46 may be provided with generally radial parallel flat annular walls 56 and 57. The radial outer end of the inner wall 57 flares axially outwardly into merging relation with an annular radial side wall 60 of the bead 48 which preferably has a generally cylindrical periphery 62. The bead 48 is slabbed off at its inner end to provide a frusto-conical wall 64 between the walls 60 and 62, and the outer end of the bead adjacent the outer wall 56 is cut away to provide an annularly extending stepped portion 65. The reinforcing disc 44 may be stamped out from suitable sheet material such as sheet metal and has a flat generally radial annular body portion 68 embedded within the molded body portion 46 and preferably bonded thereto as by vulcanizing. The inner radial end of the reinforcing disc 44 preferably extends near to the inner radial end 69 of the molded body portion 46. The peripheral portion of the reinforcing disc 46 has a frusto-conically offset wall 70 extending towards the rear wall 60 of the bead 48. The periphery of the disc is cut away to provide circumferentially spaced angularly disposed teeth 72 which may be slightly resilient. Each tooth, which is generally hook-shaped, has a rearwardly directed wall 73 continuing from the frusto-conical wall 70 and merging with an intermediate curved body portion 74 which extends to or closely adjacent to the radial side face 60 of the bead 48. An arcuate end resilient portion 76 of each tooth 72 extends angularly outwardly within the bead 48 and terminates closely adjacent to or at the stepped portion 65.

With this construction, the reinforced sealing washer as shown in FIGURE 2 may be laterally snapped into the seal mounting groove 26. The resiliency of the frusto-conical portion 76 of each hook coupled with the inherent compressible resilient characteristics of the bead 48 facilitates snapping the bead past the rounded land 30. When installed, the rearward wall 60 of the bead will sealingly seat against the annular radial shoulder 28 of the race ring 16 and the bead will deformably engage within the groove 26 without bottoming therein. Also, the intermediate curved body portions 74 of each hook will locate substantially against the radial shoulder 28 while the particonical outer end of each tooth will wedgingly and angularly engage and lock against the frusto-conical grooved portion 32 to positively locate the sealing washer in position and radially locate it across the end of the annular lubricant chamber 12. At this time, the sealing lip 50 will be laterally deflected as shown in FIGURE 1 to position the annular rib 52 in lightly wiping sealing engagement against the frusto-conical wall 38 of the inner race ring 14. The inner radial extent of the sealing lip 50 preferably does not extend into bottoming relation with the notch 36 so that an effective sealing relation will be maintained even if the inner and outer race rings 14 and 16 should become located slightly out of axial alignment.

We claim:
1. In combination with a pair of relatively rotatable members having an annular lubricant chamber therebetween, an annular closure extending across the lubricant chamber, one of said members having an annular groove radially opening towards said other member, divergent side walls in said groove, the closure comprising a molded rubber sealing washer having a compressibly resilient peripheral bead deformably and sealingly seated against the side walls of the groove, said bead being in radially spaced relation to the bottom of the groove, a reinforcing disc embedded in and bonded to said washer, a plurality of circumferentially spaced teeth on the disc and embedded in the bead, and each tooth being laterally bent axially away from the body of the disc to a side wall of the bead and then extending angularly through the bead in an opposite direction to the opposite side wall of the bead, said teeth being resilient to facilitate deformably snapping the bead into mounted position in the groove with the ends of said teeth tightly wedged against the opposite walls of said groove.

2. In combination with a pair of relatively rotatable rings having an annular lubricant chamber therebetween, a rubber-like sealing washer extending across an end of the lubricant chamber, one of the rings having an annular groove radially opening towards the other ring, said groove being formed between a transversely rounded annular land and an annularly extending generally radial shoulder, a peripherally extending resilient bead on said washer having a diameter intermediate that of the land and the bottom of the groove, said bead being arranged to be deformably snapped past the land for compressibly seating the bead in sealing engagement with the side walls of said groove, a reinforcing disc embedded in the washer, circumferentially spaced teeth extending radially from the body portion of the disc and embedded in said bead, each tooth having a laterally projecting intermediate rounded portion at the inner side of the bead and tightly abutting said radial shoulder, and each tooth having a resilient portion angularly extending from its rounded portion across and through the bead into wedged endwise engagement against the side wall of the groove opposite said radial shoulder to secure the sealing washer in mounted position.

References Cited in the file of this patent
UNITED STATES PATENTS

| | | |
|---|---|---|
| 2,298,463 | Burt | Oct. 13, 1942 |
| 2,734,757 | Martin | Feb. 14, 1956 |
| 2,755,113 | Baumheckel | July 17, 1956 |
| 2,766,082 | Ritchey | Oct. 9, 1956 |